(12) United States Patent
Gualtieri

(10) Patent No.: US 7,554,324 B2
(45) Date of Patent: Jun. 30, 2009

(54) TURBINE BLADE PROXIMITY SENSOR AND CONTROL SYSTEM

(75) Inventor: Devlin M. Gualtieri, Ledgewood, NJ (US)

(73) Assignee: Honeywell International Inc., Morristown, NJ (US)

( * ) Notice: Subject to any disclaimer, the term of this patent is extended or adjusted under 35 U.S.C. 154(b) by 46 days.

(21) Appl. No.: 10/696,215

(22) Filed: Oct. 28, 2003

(65) Prior Publication Data

US 2005/0088171 A1    Apr. 28, 2005

(51) Int. Cl.
*G01B 7/14* (2006.01)
(52) U.S. Cl. ............................ 324/207.26; 324/207.16; 324/655
(58) Field of Classification Search ............ 324/207.15, 324/207.16, 207.17, 207.25, 207.26, 654, 324/655, 667, 668, 682; 73/861.78, 861.79
See application file for complete search history.

(56) References Cited

U.S. PATENT DOCUMENTS

| | | | |
|---|---|---|---|
| 3,177,711 A * | 4/1965 | Ham et al. ............... 73/861.78 |
| 3,618,805 A | 11/1971 | Bean |
| 4,186,792 A | 2/1980 | Yamada et al. |
| 4,230,436 A * | 10/1980 | Davison .................... 415/1 |
| 4,324,144 A * | 4/1982 | Miyata et al. ........... 73/861.77 |
| 4,417,208 A | 11/1983 | Hachtel et al. |
| 4,563,643 A | 1/1986 | Leschek et al. |
| 4,604,251 A | 8/1986 | Kuhman |
| 4,644,270 A * | 2/1987 | Oates et al. ............ 324/207.25 |
| 4,842,477 A * | 6/1989 | Stowell ...................... 415/118 |
| 4,843,259 A | 6/1989 | Weisshaupt |
| 5,126,664 A | 6/1992 | Howard |
| 5,180,978 A | 1/1993 | Postma et al. |
| 5,211,539 A | 5/1993 | McCarty |
| 5,497,147 A * | 3/1996 | Arms et al. ............ 340/870.35 |
| 5,504,425 A | 4/1996 | Fericean et al. |
| 5,742,161 A | 4/1998 | Karte |
| 5,854,553 A | 12/1998 | Barclay et al. |
| 6,069,475 A * | 5/2000 | Isomura et al. ............. 324/244 |
| 6,211,667 B1 | 4/2001 | Volonterio et al. |
| 6,288,536 B1 | 9/2001 | Mandl et al. |
| 6,335,619 B1 | 1/2002 | Schwab et al. |
| 6,346,807 B1 | 2/2002 | Slates |
| 6,433,541 B1 | 8/2002 | Lehman et al. |
| 6,462,536 B1 | 10/2002 | Mednikov et al. |
| 6,486,657 B2 * | 11/2002 | Schroeder .............. 324/207.21 |
| 6,566,862 B1 | 5/2003 | Goto et al. |
| 6,658,216 B1 * | 12/2003 | Iida et al. .................... 398/187 |

FOREIGN PATENT DOCUMENTS

GB       2167603 A  *  5/1986

* cited by examiner

*Primary Examiner*—Patrick J Assouad
*Assistant Examiner*—David M. Schindler
(74) *Attorney, Agent, or Firm*—Ingrassia Fisher & Lorenz, P.C.

(57) ABSTRACT

A proximity sensor system uses a sensor coil as the frequency determining element of an oscillator circuit. The frequency of the oscillator circuit is thus modulated based on the proximity of the sensor coil to a conductive element, thereby supplying a frequency modulated sensor signal. A frequency modulation (FM) detector circuit demodulates the sensor signal, and supplies a signal having an amplitude that varies with, and is representative of, the proximity of the sensor coil to the conductive element.

8 Claims, 4 Drawing Sheets

TURBINE BLADE PROXIMITY SENSOR AND CONTROL SYSTEM

FIELD OF THE INVENTION

The present invention relates to proximity sensors and, more particularly, to a proximity sensor and control system that senses and controls the proximity of rotating turbine blades to one or more non-rotating components.

BACKGROUND OF THE INVENTION

A gas turbine engine may be used to power various types of vehicles and systems. A particular type of gas turbine engine that may be used to power aircraft is a turbofan gas turbine engine. A turbofan gas turbine engine may include, for example, five major sections, a fan section, a compressor section, a combustor section, a turbine section, and an exhaust section. The fan section is positioned at the front, or "inlet" section of the engine, and includes a fan that induces air from the surrounding environment into the engine, and accelerates a fraction of this air toward the compressor section. The remaining fraction of air induced into the fan section is accelerated into and through a bypass plenum, and out the exhaust section.

The compressor section raises the pressure of the air it receives from the fan section to a relatively high level. In a multi-spool engine, the compressor section may include two or more compressors. For example, in a triple spool engine, the compressor section may include a high pressure compressor, and an intermediate compressor. The compressed air from the compressor section then enters the combustor section, where a ring of fuel nozzles injects a steady stream of fuel. The injected fuel is ignited by a burner, which significantly increases the energy of the compressed air.

The high-energy compressed air from the combustor section then flows into and through the turbine section, causing rotationally mounted turbine blades to rotate and generate energy. The air exiting the turbine section is exhausted from the engine via the exhaust section, and the energy remaining in this exhaust air aids the thrust generated by the air flowing through the bypass plenum.

Similar to the compressor section, in a multi-spool (e.g., multi-shaft) engine the turbine section may include a plurality of turbines. For example, in a triple spool engine, the turbine section may include a high pressure turbine, an intermediate pressure turbine, and a low pressure turbine. The energy generated in each of the turbines may be used to power other portions of the engine. For example, the low pressure turbine may be used to power the fan via one spool, the intermediate turbine may be used to power the intermediate pressure turbine via another spool that is concentric to the low pressure turbine spool, and the high pressure turbine may be used to power the high pressure compressor via yet another concentric spool.

Typically, each turbine in a multi-spool gas turbine engine is mounted within a turbine case. The rotationally mounted blades in each turbine extend radially from its associated spool, and are surrounded by, and spaced apart from, an annular seal that is attached to the turbine case. The radial clearance between the turbine blade ends and the annular seal is preferably minimized, in order to reduce leakage of fluid (e.g., air) past the turbine blades. This is because turbine efficiency decreases as fluid leakage past the turbine blades increases.

During a typical gas turbine engine operating cycle, rotational speed and temperature variations within the turbine may result in variations of the radial clearance between the blades and the annular seal. Hence, to avoid contact between the blades and annular seal, the clearance between these components may, under some circumstances, be larger than would otherwise be desirable for certain engine operating conditions. The condition that results in the smallest radial clearance between the blades and annular seal occurs when the gas turbine engine is quickly brought up to full power. This may occur, for example, during an aircraft take-off and climb to cruise altitude. During an aircraft take-off, the turbine blades heat up rapidly and thermally expand. Additionally, the turbine's rotational speed increases, subjecting the blades to centrifugal forces that may cause radial blade growth. At the same time, the annular seal, and the turbine case that supports it, may both heat up rapidly and thermally expand.

After take-off and climb to cruise altitude, when the gas turbine engine is operated in a lower power condition, a temperature equilibrium situation may be reached in the engine. However, the equilibrium temperature reached in various components of the turbines may result in the radial clearance between the turbine blades and annular seal being larger than desirable, resulting in undesirable leakage and concomitantly low engine efficiency.

The rate at which the turbine case and turbine blades thermally expand are preferably matched so that the turbine blade/annular seal radial clearance remains within minimal clearance limits. Attempts have been made to overcome the problem of variation in the radial gap between the sealing member and the blades by providing, in some instances, a sensing and control system. In many of these sensing and control systems, one or more proximity sensors mounted within the turbine case sense the turbine blade/annular seal radial clearance and, in response to the sensed clearance, control the temperature of the turbine case. Many different types of proximity sensors have been, or are being, used to sense turbine blade/annular seal radial clearance. Included among these are capacitance sensors, inductance sensors, optical sensors, acoustic/dynamic response sensors, microwave resonant cavity sensors, and X-ray sensors.

Although safe and generally effective, presently known sensing and control systems suffer certain drawbacks. Namely, the response characteristics, accuracy, and/or reliability of many of the above-mentioned proximity sensor types is not as high as desirable when use in the operating environment of a gas turbine engine. As a result, proximity sensor replacement may be needed more often than is desirable, and turbine efficiency may be decreased, since proximity sensor accuracy may below. Both of these drawbacks can lead to increased system and operational costs.

Hence, there is a need for a turbine blade proximity sensor that addresses one or more of the above-noted drawbacks. Namely, a proximity sensor that exhibits sufficiently high and sufficiently consistent response, accuracy, and reliability in the potentially harsh gas turbine engine environment. The present invention addresses one or more of these needs.

SUMMARY OF THE INVENTION

The present invention provides a turbine blade proximity sensor that exhibits sufficiently high and sufficiently consistent response, accuracy, and reliability in the potentially harsh gas turbine engine environment, and a control system that uses the proximity sensor to control the clearance between the turbine blades and one or more non-rotating turbine components.

In one embodiment, and by way of example only, a turbine blade proximity sensor for sensing proximity of each of a plurality of turbine blades to a non-rotating turbine component includes a sensor coil, an oscillator circuit, and a frequency modulation (FM) detector circuit. The oscillator circuit is coupled to the sensor coil and is operable to supply a sensor signal that is frequency modulated based on the proximity of the sensor coil to each of the turbine blades. The FM detector circuit is coupled to receive the frequency modulated sensor signal and is operable, in response thereto, to supply a proximity signal having an amplitude that varies with, and is representative of, the proximity of each of the turbine blades to the non-rotating turbine component.

In another exemplary embodiment, a turbine blade proximity control system for controlling proximity of each of a plurality of turbine blades, rotating at a rotational rate, to a non-rotating turbine component includes a sensor coil, an oscillator circuit, a frequency modulation (FM) detector circuit, and a controller. The oscillator circuit is coupled to the sensor coil and is operable to supply a sensor signal that is frequency modulated based on the proximity of the sensor coil to each of the turbine blades. The FM detector circuit is coupled to receive the frequency modulated sensor signal and is operable, in response thereto, to supply a proximity signal having an amplitude that varies with, and is representative of, the proximity of each of the turbine blades to the non-rotating turbine component. The controller is coupled to receive the proximity signal from the FM detector and is operable, in response thereto, to control the proximity of the turbine blades to the shroud.

In still another exemplary embodiment, a gas turbine engine includes a turbine case, a turbine wheel, a plurality of turbine blades, and a turbine blade proximity sensor system. The turbine wheel is rotationally mounted within the turbine case and is configured to rotate at a rotational rate. The turbine blades extend from the turbine wheel toward the turbine case. The turbine blade proximity sensor system includes a sensor coil, an oscillator circuit, and a frequency modulation (FM) detection circuit. The sensor coil is disposed at least partially within the turbine case. The oscillator circuit is coupled to the sensor coil and is operable to supply a sensor signal that is frequency modulated based on the proximity of the sensor coil to each of the turbine blades. The FM detector circuit is coupled to receive the frequency modulated sensor signal and is operable, in response thereto, to supply a proximity signal having an amplitude that varies with, and is representative of, the proximity of each of the turbine blades to either the turbine case or one or more components mounted thereto.

In yet another exemplary embodiment, a method of determining proximity of each of a plurality of turbine blades, rotating at a rotational rate, to a non-rotating turbine component, includes supplying a sensor signal is frequency modulated based on the proximity of each of the turbine blades to the non-rotating turbine component. The frequency modulated sensor signal is frequency demodulated to thereby supply a proximity signal having an amplitude that varies with, and is representative of, the proximity of each of the turbine blades to the non-rotating turbine component.

Other independent features and advantages of the preferred proximity sensor and control system will become apparent from the following detailed description, taken in conjunction with the accompanying drawings which illustrate, by way of example, the principles of the invention.

DETAILED DESCRIPTION OF A PREFERRED EMBODIMENT

Before proceeding with a detailed description, it is to be appreciated that the described embodiment is not limited to use in conjunction with a particular type of turbine engine, or even to use in a turbine. Thus, although the present embodiment is, for convenience of explanation, depicted and described as being implemented in a multi-spool turbofan gas turbine jet engine, it will be appreciated that it can be implemented in various other types of turbines, and in various other systems and environments.

Figure 1:
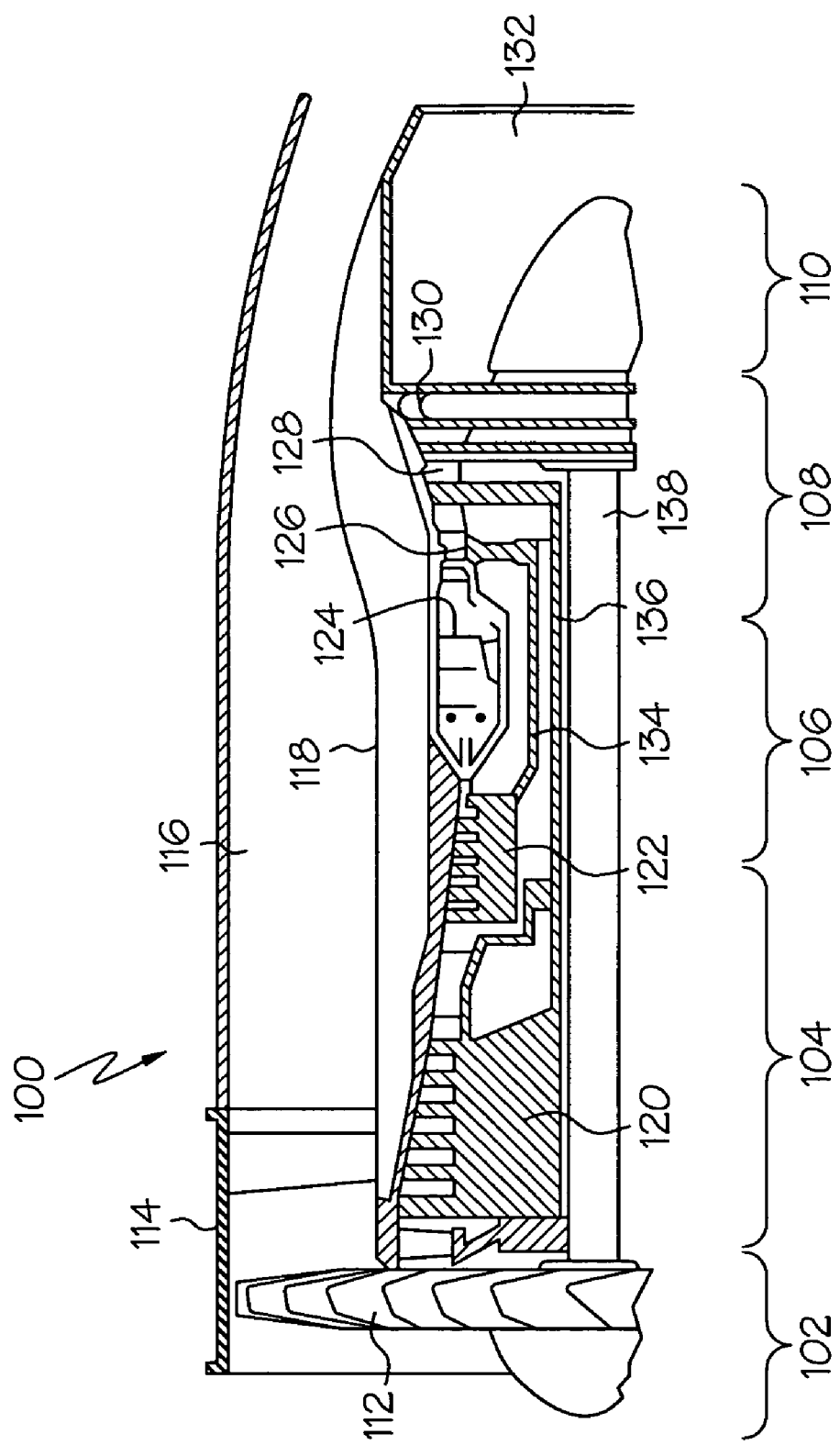
FIG. 1 is a cross section side view of a portion of an exemplary gas turbine engine according to an embodiment of the present invention.

An exemplary embodiment of a multi-spool turbofan gas turbine jet engine 100 is depicted in FIG. 1, and includes an intake section 102, a compressor section 104, a combustion section 106, a turbine section 108, and an exhaust section 110. The intake section 102 includes a fan 112, which is mounted in a fan case 114. The fan 112 draws air into the intake section 102 and accelerates it. A fraction of the accelerated air exhausted from the fan 112 is directed through a bypass section 116 disposed between the fan case 114 and an engine cowl 118, and provides a forward thrust. The remaining fraction of air exhausted from the fan 112 is directed into the compressor section 104.

The compressor section 104 includes two compressors, an intermediate pressure compressor 120, and a high pressure compressor 122. The intermediate pressure compressor 120 raises the pressure of the air directed into it from the fan 112, and directs the compressed air into the high pressure compressor 122. The high pressure compressor 122 compresses the air still further, and directs the high pressure air into the combustion section 106. In the combustion section 106, which includes a plurality of combustors 124, the high pressure air is mixed with fuel and combusted. The combusted air is then directed into the turbine section 108.

The turbine section 108 includes three turbines disposed in axial flow series, a high pressure turbine 126, an intermediate pressure turbine 128, and a low pressure turbine 130. The combusted air from the combustion section 106 expands through each turbine, causing it to rotate. The air is then exhausted through a propulsion nozzle 132 disposed in the exhaust section 110, providing addition forward thrust. As the turbines rotate, each drives equipment in the engine 100 via concentrically disposed shafts or spools. Specifically, the high pressure turbine 126 drives the high pressure compressor 122 via a high pressure spool 134, the intermediate pressure turbine 128 drives the intermediate pressure compressor 120 via an intermediate pressure spool 136, and the low pressure turbine 130 drives the fan 112 via a low pressure spool 138.

Figure 2:
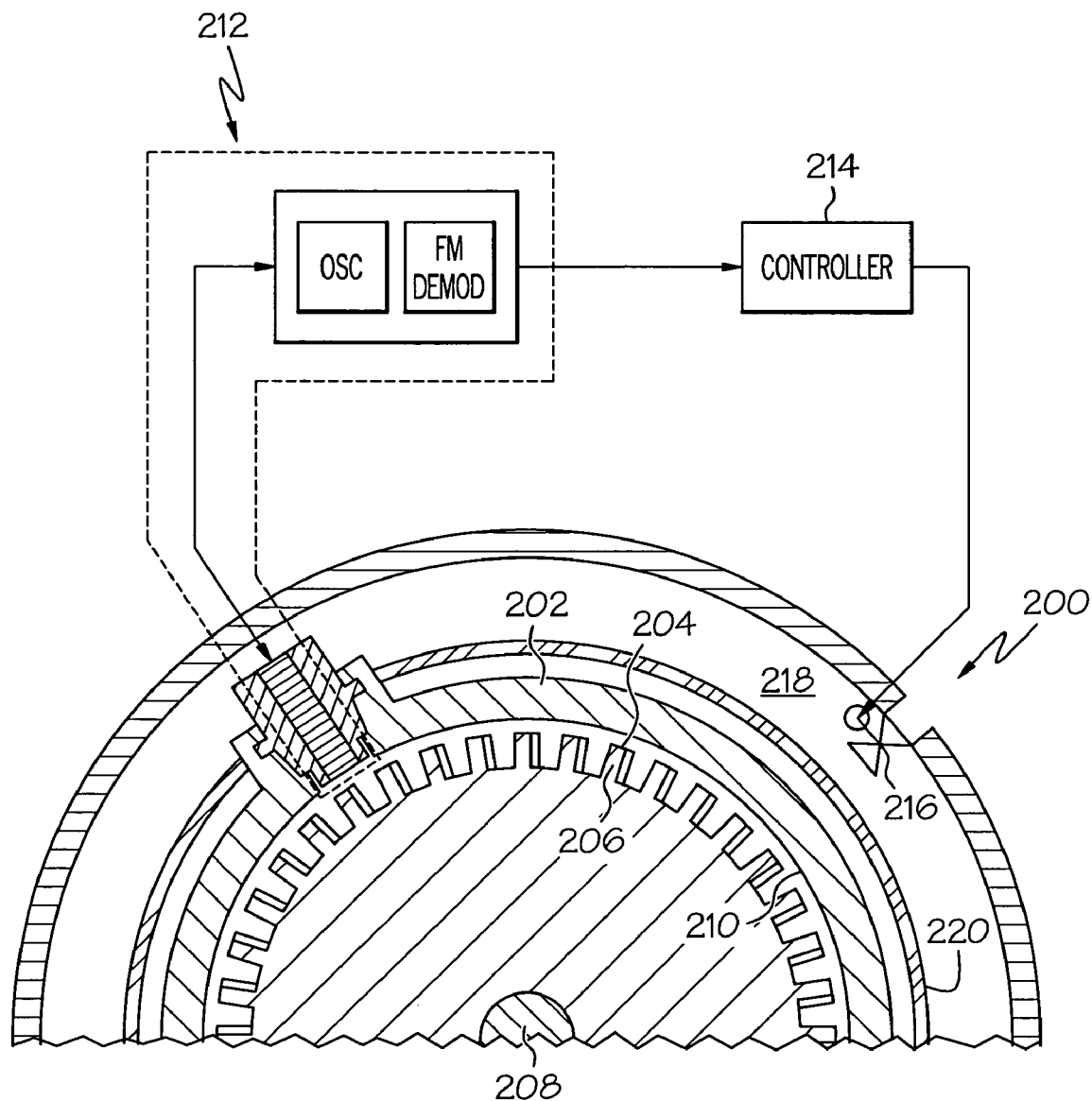
FIG. 2 is a simplified cross section end view of a portion of an exemplary turbine that may be used in the engine of FIG. 1, and showing schematically the interconnection of external sensing and control systems to the turbine section.

Turning now to FIG. 2, a simplified cross section end view of a portion of a turbine, and a schematic representation of the interconnection of external sensing and control systems to the turbine, is shown. It should be understood that the depicted turbine 200, while illustrated in a simplified manner, is representative of any one of the high pressure 126, intermediate pressure 128, or low pressure 130 turbines included in the turbine section 108 of the engine 100 depicted in FIG. 1, and described above. It should additionally be understood that the turbine 200 is also representative of any one of numerous turbines that may be implemented in numerous other and varied environments.

With the above background in mind, it is seen that the turbine 200 is mounted within a turbine case 202, and includes one or more sets of moveable turbine blades 204. While not depicted for clarity sake, it will be appreciated that the turbine 200 may additionally include one or more sets of fixed stator blades. It will additionally be appreciated that, for clarity, only a single set of turbine blades 204 is shown in FIG. 2. The turbine blades 204 are each coupled to, and extend from, a turbine wheel 206, which is in turn mounted on a shaft or spool 208. A plurality of annular seals (not shown) may be coupled to the inner surface 210 of the turbine case 202.

As was noted above, during operation of the turbine 200, the turbine case 202 thermally expands and contracts. This expansion and contraction, coupled with variations in turbine speed, result in variations in the gaps between the turbine case 202 and the turbine blades 204. As was additionally noted above, the gap sizes and variations in gap sizes are preferably minimized to reduce fluid leakage past the turbine blades 204. In order to minimize the variations in gap size, the clearance between the turbine blades 204 and the turbine case 202, or other components coupled to the turbine case 202, such as annular seals, is sensed by a proximity sensor system 212. In response to the clearances sensed by the proximity sensor system 212, the turbine case 202 is selectively cooled by selectively directing cooling air onto the turbine case 202. In the depicted embodiment, a controller 214 is coupled to the proximity sensor system 212 and, in response, supplies valve position commands to one or more valve assemblies 216 (for clarity, only one shown). The valve assembly 216, shown in simplified schematic form in FIG. 2, is disposed in an annular space 218 formed between, for example, the engine cowl 118 and a manifold 220 that surrounds the the turbine case 202. In response to the valve commands from the controller 214, the valve assembly 216 selectively opens and closes, to selectively direct cooling air to the turbine case 202, via the manifold 220. With reference now to FIGS. 3-7, a detailed description of a particular preferred embodiment of the proximity sensor system 212 and its operation will be provided.

Figure 3:
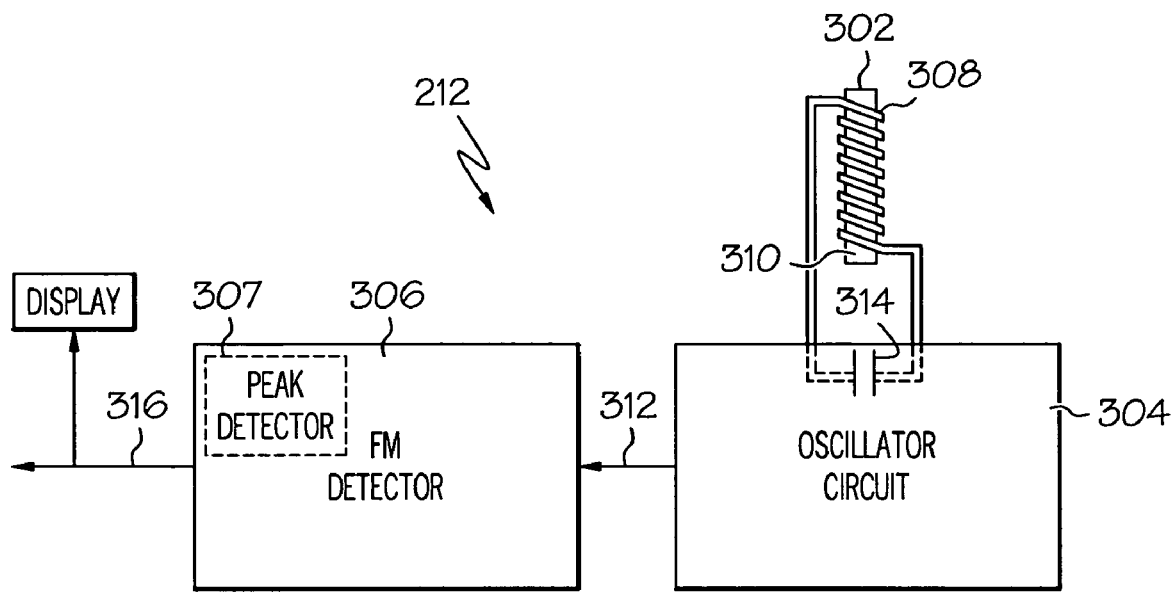
FIG. 3 is a functional block diagram of a proximity sensor system that may be used in the turbine section of the engine shown in FIGS. 1 and 2.

The proximity sensor system 212, shown in functional block diagram form in FIG. 3, includes a sensor coil 302, an oscillator circuit 304, and a frequency modulation (FM) detection circuit 306. The sensor coil 302 is preferably configured as an eddy current type sensor. As such, the sensor coil 302 is a multi-turn inductance coil that includes a wire conductor 308 that is preferably wound on a core 310. In a particular preferred embodiment, in which the proximity sensor 226 is used in a turbine engine environment, the wire conductor 308 is a high melting point, high conductivity wire such as, for example, platinum or molybdenum, though it will be appreciated that it could be formed of numerous other conductors, depending upon the end-use environment. Moreover, as will be described more fully below, the sensor coil 302 functions as the frequency determining element of the oscillator circuit 304. Thus, to attain a high Q-factor, the sensor coil 302 preferably has a low resistance. In accordance with a particular preferred embodiment, constructing the sensor coil using a 20 A.W.G. platinum wire conductor 308 provides the desired Q-factor.

Figure 4:
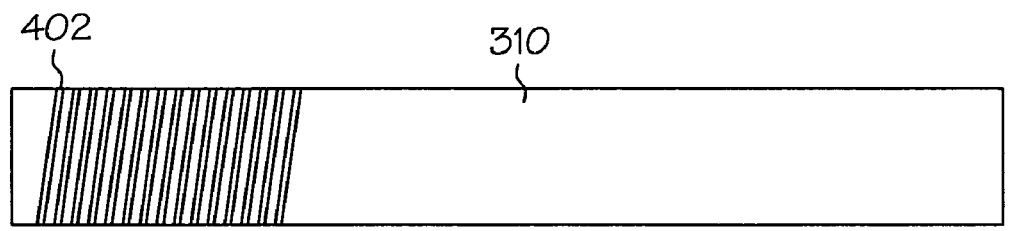
FIGS. 4 and 5 are top and side views, respectively, of an exemplary inductance sensor coil that may be used in the proximity sensor system of FIG. 3.
Figure 5:
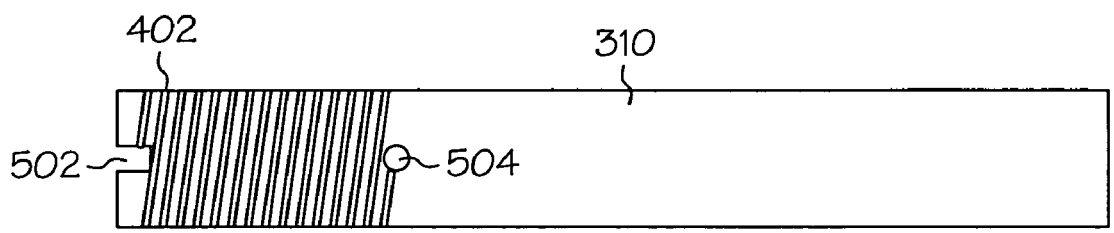

The core 310 is used to support the wire conductor 308 and a particular physical embodiment of the core 310 is shown in top and side views in FIGS. 4 and 5, respectively. As can be seen, the core 310 is preferably, though not necessarily, tube-shaped, and may be either solid or hollow. The core 310 includes a helical groove 402 formed in an outer surface thereof, a notch 502 formed in one end, and a hole 504. The conductor 308 (not shown in FIGS. 4 and 5) is wound around the core 310 by disposing it partially within the groove 402. This helps to maintain the spacing between the coil turns, which provides uniform current flow and inductance effects. The notch 502 and hole 504 are used to capture the ends of the conductor 308 when it is wound on the core 310. The core 310, like the conductor 308, is also preferably formed of high temperature material such as, for example, alumina or zirconia, though it will be appreciated that it could also be formed of numerous other materials, depending upon the end use environment.

Returning once again to FIG. 3, the oscillator circuit 304 is coupled to the sensor coil 302 and, as will be described more fully below, supplies a variable frequency and variable amplitude sensor signal 312. The oscillator circuit 304 may be implemented using any one of numerous known types of oscillator circuits and oscillator circuit topologies, so long as it exhibits the appropriate circuit response characteristics. No matter the particular type or circuit topology, the oscillator circuit 304 includes a capacitive circuit element 314, which may be implemented as a single capacitor or multiple capacitors electrically coupled in parallel, series, or combination thereof to meet desired circuit characteristics. In any case, when the sensor coil 302 is coupled to the oscillator circuit 304, the capacitive circuit element 314 and sensor coil 302 are electrically coupled in parallel. Thus, the sensor coil 302 and the capacitive circuit element 314 form a parallel-resonant LC tank circuit, which determines the frequency of the oscillator circuit 304, and thus the instantaneous frequency of the sensor signal 312.

More particularly, and as is generally known, the resonant frequency of a parallel-resonant LC tank circuit is:

$$f_{res} = \frac{1}{2\pi\sqrt{LC}}$$

where $f_{res}$ is the resonant frequency (Hz), L is the inductance (H), and C is the capacitance (F). As is also generally known, when an inductance coil, such as the sensor coil 302, is in close proximity to a conductor, such as a turbine blade, the conductor acts as a shorted coil turn that counteracts the inductance of the last coil turn. Thus, the sensor coil 302, when implemented in the turbine engine 200 as outlined above, will exhibit an inductance (L) that varies with the proximity of the sensor coil 302 to the turbine blades 204. In particular, the inductance of the sensor coil 302 will decrease the closer a turbine blade 204 is to the sensor coil 302. As such, the frequency of the sensor signal 312 supplied by the oscillator circuit 304 will concomitantly vary with the proximity of the sensor coil 302 to the turbine blades 204. Thus, the sensor signal 312 is frequency modulated based on the proximity of the turbine blades 204 to the sensor coil 302, and at the rotational rate of the turbine wheel 206.

It will be appreciated that the sensor coil 302 and capacitance element 314 may be constructed and/or selected to exhibit any one of numerous inductance and capacitance values, respectively, in order to cause the oscillator circuit 304 to oscillate within a desired frequency range. While it will be appreciated that the operational frequency range of the oscillator circuit 304 may be selected from any one of numerous ranges, in a particular preferred embodiment, the sensor coil 302, the capacitive circuit element 314, and the oscillator circuit 304 are constructed and/or selected to provide an operational frequency range of about 20 MHz to 100 MHz. Moreover, it will be appreciated that the oscillator circuit 304 may be configured to transmit the sensor signal 312 over a hardwired connection to the FM detector circuit 306, or to transmit the sensor signal 312 wirelessly.

Figure 6:
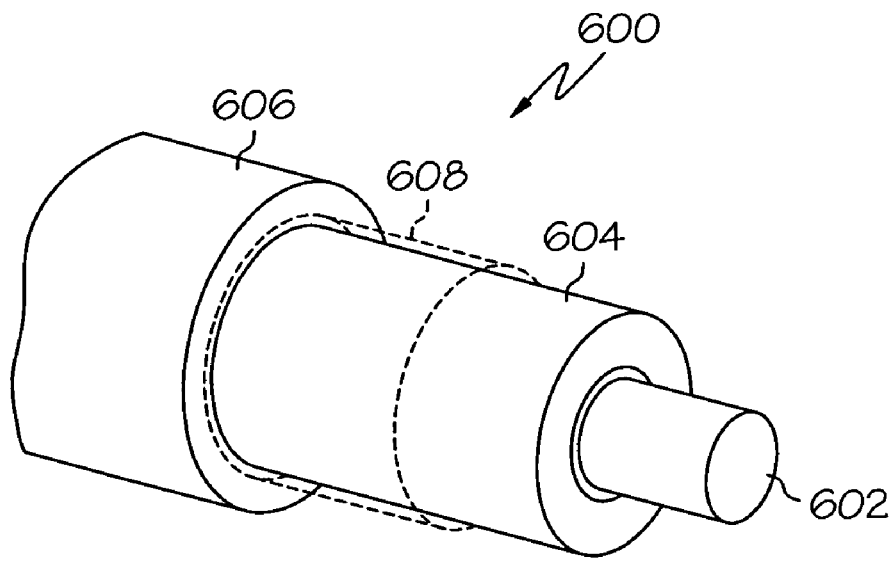
FIG. 6 is a perspective, cut away view of a high temperature coaxial cable that may be used in the proximity sensor system of FIG. 3.

Before proceeding with a description of the FM detector circuit 306, it is noted that in a particular preferred embodiment the sensor coil 302 is coupled to the oscillator circuit 304 via a high temperature coaxial cable. A partial cutaway perspective view of one such cable is shown in FIG. 6. Preferably, the cable 600 includes an inner conductor 602, an electrical insulator 604, and an outer conductor 606, all of which may be encased in a non-illustrated electrically insulating sheath or housing. The inner conductor 602 may be formed of any one of numerous known conductive materials, and may additionally include one or more strands of wire. In the depicted embodiment, the inner conductor 602 is a platinum wire.

The insulator 604 is preferably formed of a ceramic material, such as alumina or zirconia, and surrounds the inner conductor 602, electrically insulating the inner 602 and outer 606 conductors from one another. The outer conductor 606 may also be made of any one of numerous materials, but in the depicted embodiment it is a stainless steel tube. The insulator 604 also acts as a dielectric between the inner 602 and outer 606 conductors, which forms a cylindrical capacitor. Thus, it will be appreciated that the coaxial cable 600, when included, forms either a portion or the entire the capacitive circuit element 308 in the oscillator circuit 304. It will additionally be appreciated that the capacitance exhibited by the coaxial cable 600 can be reduced, if needed or desired, by including a shield electrode 608 (shown in phantom in FIG. 6) between the inner 602 and outer 606 conductors. Although shown as being disposed between the outer conductor 606 and the insulator 604, it will be appreciated that the shield electrode 608 could also be disposed between the inner conductor 602 and the insulator 604, or embedded between separate sections of insulator 604.

Returning now to FIG. 3, the FM detector circuit 306 is configured to receive the sensor signal 312 from the oscillator circuit 304. As was alluded to above, the FM detector circuit 306 may be configured to receive the sensor signal 312 via a hardwired connection, or wirelessly. Moreover, the FM detector circuit 306 may be implemented as any one of numerous known FM demodulator circuits including, but not limited to, a slope detector, a Foster-Seeley detector, a quadrature detector, a phase-locked loop (PLL), and a digital signal processor (DSP). In a particular preferred embodiment, however, a ratio detector is used. As is generally known, a ratio detector uses a double-tuned transformer to convert the instantaneous frequency variations in an FM signal to an amplitude signal.

No matter the particular type of demodulator that is used to implement the FM detector circuit 306, each demodulator converts the instantaneous frequency variations in the frequency modulated sensor signal 312 to a proximity signal 316 that varies in amplitude with the instantaneous frequency of the sensor signal 312. It will be appreciated that, since the instantaneous frequency of the sensor signal 312 varies with proximity of the sensor coil 302 to the rotating body (e.g., turbine blades), the amplitude of the proximity signal 316 is representative of the proximity of the sensor coil 302 to the rotating body. In particular, the amplitude of the proximity signal 316 will increase the closer the rotating body is to the sensor coil 302. Thus, the peak value of the proximity signal 316 indicates the minimum gap spacing at a given time. As such, the FM detector circuit 306, as shown in FIG. 3, may additionally include a peak detector circuit 307, which determines the peak value of the proximity signal 316. The peak detector circuit 307 may be implemented using any one of numerous know peak detector circuit configurations. Moreover, the peak detector circuit 307, while depicted as be implemented as part of the FM detector circuit 306, could be implemented as a separate, individual circuit. As FIG. 3 additionally shows, the proximity signal 316 is then supplied to the controller 214, and may additionally be supplied to one or more displays 318. The peak value of the proximity signal 316 may also be supplied to either or both the controller 214 and the displays 318.

Figure 7:
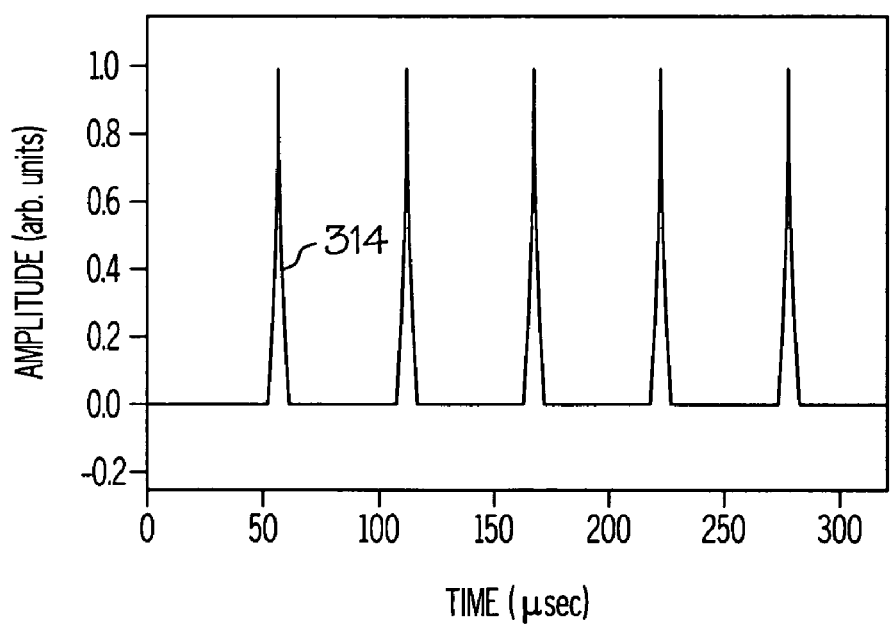
FIG. 7 is a diagram showing an exemplary output waveform of the proximity sensor system of FIG. 3.

With reference now to FIG. 7, a representative proximity signal waveform is shown. This particular waveform depicts the proximity signal 316 supplied by the FM detector circuit 306 when the proximity sensor system 212 is used to sense turbine blade clearance for a turbine having 38 blades and rotating at 28,000 revolutions per minute (rpm). With such a turbine, the blade rate past the sensor coil 302 is about 17.7 kHz. Thus, the proximity signal 316 has a similar frequency, and the proximity signal amplitude, as was noted above, increases as each turbine blade passes the sensor coil 302, and the peak value indicates the minimum gap spacing at a given time.

The proximity sensor system described herein exhibits a high and a consistent response, accuracy, and reliability, even in a potentially harsh environment, such as a gas turbine engine.

While the invention has been described with reference to a preferred embodiment, it will be understood by those skilled in the art that various changes may be made and equivalents may be substituted for elements thereof without departing from the scope of the invention. In addition, many modifications may be made to adapt to a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

I claim:

1. A turbine blade proximity control system for controlling proximity of each of a plurality of turbine blades to a non-rotating turbine component, comprising:
   a sensor coil;
   an oscillator circuit including one or more capacitance circuit elements electrically coupled in parallel with the sensor coil to thereby form a parallel-resonant LC tank circuit having a resonant frequency that varies with the proximity of the sensor coil to each of the turbine blades, the oscillator circuit operable to generate and supply a sensor signal having a frequency that varies based on the resonant frequency of the parallel-resonant LC circuit, whereby the sensor signal is a frequency modulated sensor signal;

a frequency modulation (FM) demodulator adapted to receive the frequency modulated sensor signal and operable, in response thereto, to supply a proximity signal having an amplitude that varies with, and is representative of, the proximity of each of the turbine blades to the non-rotating turbine component; and a controller coupled to receive the proximity signal from the frequency modulation demodulator and operable, in response thereto, to control the proximity of the turbine blades to the non-rotating turbine component.

2. The system of claim 1, wherein:

the non-rotating turbine component is either a turbine case or a component coupled to the turbine shroud; and the controller controls the proximity of the turbine blades to the non-rotating turbine component by controlling turbine shroud temperature.

3. The system of claim 2, wherein the controller, in response to the proximity signal, supplies one or more valve control signals, and wherein the system further comprises:

one or more valves in fluid communication between a cooling air source and the turbine shroud, each valve having an actuator coupled to receive one or more of the valve control signals and operable, in response thereto, to selectively move its associated valve between an open position and a closed position, to thereby selectively cool the turbine case.

4. The system of claim 1, further comprising:

a display coupled to receive the proximity signal from the FM demodulator and operable, in response thereto, to supply a visual display of the proximity of each of the turbine blades to the turbine shroud.

5. The system of claim 1, further comprising:

a coaxial cable coupled between the sensor coil and the oscillator circuit, the coaxial cable having a capacitance that acts as at least one of the capacitance circuit elements.

6. The system of claim 1, wherein the sensor coil comprises:

a ceramic core; and a conductor selected from the group consisting of platinum and molybdenum.

7. The system of claim 1, further comprising:

a peak detector coupled to receive the proximity signal and operable, in response thereto, to determine a peak value of the proximity signal.

8. A gas turbine engine, comprising:

a turbine case;

a turbine wheel rotationally mounted within the turbine case;

a plurality of turbine blades extending from the turbine wheel toward the turbine case; and a turbine blade proximity sensor system including:

a sensor coil disposed at least partially within the turbine case, an oscillator circuit including one or more capacitance circuit elements electrically coupled in parallel with the sensor coil to thereby form a parallel-resonant LC tank circuit having a resonant frequency that varies with the proximity of the sensor coil to each of the turbine blades, the oscillator circuit operable to generate and supply a sensor signal having a frequency that varies based on the resonant frequency of the parallel-resonant LC tank circuit, whereby the sensor signal is a frequency modulated sensor signal, a frequency modulation (FM) demodulator coupled to receive the frequency modulated sensor signal and operable, in response thereto, to supply a proximity signal having an amplitude that varies with, and is representative of, the proximity of each of the turbine blades to either the turbine case or one or more components mounted thereto, and a controller coupled to receive the proximity signal from the frequency modulation demodulator and operable, in response thereto, to control the proximity of each of the turbine blades to either the turbine case or one or more components mounted thereto.

* * * * *